Aug. 6, 1940.  R. C. KRAMER  2,210,624
BLIND FOR MOTOR VEHICLES
Filed Oct. 26, 1937
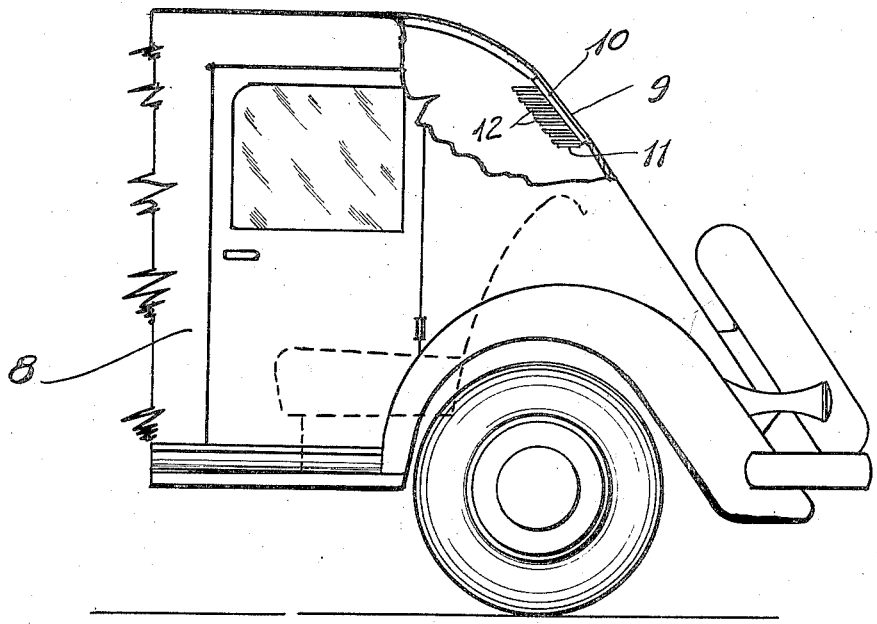
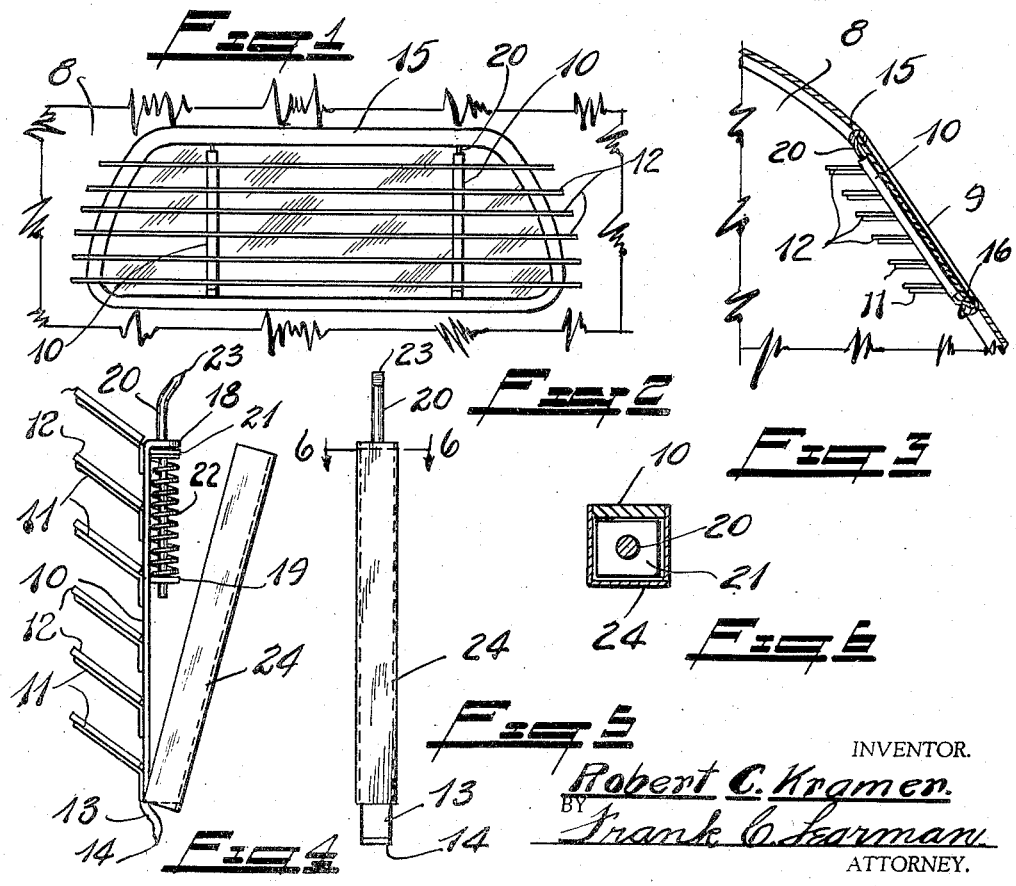
INVENTOR.
Robert C. Kramer.
BY Frank C. Searman
ATTORNEY.

Patented Aug. 6, 1940

2,210,624

UNITED STATES PATENT OFFICE 2,210,624

BLIND FOR MOTOR VEHICLES

Robert C. Kramer, Bay City, Mich., assignor of one-half to Charles Finn, Bay City, Mich.

Application October 26, 1937, Serial No. 171,074

4 Claims. (Cl. 156—15)

This invention relates to blinds and more particularly to a blind designed to be attached to the rear window of the conventional streamlined automobile to exclude the direct rays of the sun.

One of the prime objects of the invention is to design a simple, practical, and economical blind of neat and pleasing appearance, which when placed in position in the conventional streamlined motor vehicle, excludes the direct rays of the sun which normally shines directly on the occupants of the rear seat and also on the upholstery, making it uncomfortably warm for the occupants of the vehicle and also fading the upholstry and interior trimmings of the vehicles.

Another object of the invention is to design a blind which can be very quickly and easily installed or removed without the use of bolts, rivets or other securing means which necessitates boring holes or piercing the wood, metal, or interior trim.

A further object is to provide a blind which is very simple and economical to manufacture, which can be sold as any accessory for used cars, or installed in new cars, which will not rattle or vibrate, and which can be finished to harmonize with the interior trim.

With the above and other objects in view, the present invention consists in the combination and arrangement of parts, hereinafter more fully described, illustrated in the accompanying drawing, and more particularly pointed out in the appended claims, it being understood that changes may be made in the form, size, proportion and minor details of construction, without departing from the spirit, or sacrificing any of the advantages of the invention.

In the drawing:

Fig. 1 is a fragmentary side elevational view of an automobile, the side panel being broken away to show my blind in position therein.

Fig. 2 is an enlarged fragmentary view looking back from the driver's seat in the vehicle.

Fig. 3 is an enlarged fragmentary transverse sectional edge view.

Fig. 4 is an enlarged detail view of the bar support, the cover being shown swung outwardly.

Fig. 5 is a rear view, and

Fig. 6 is an enlarged sectional plan view taken on the line 6—6 of Fig. 5.

Referring now more particularly to the drawing in which I have shown the preferred embodiment of my invention, the numeral 8 indicates the body of a streamlined vehicle having a window 9 in the rear end thereof, and I wish to direct particular attention to the fact that this rear end slopes inwardly and is curved over so that the rear window 9 is positioned at approximately an angle of forty-five degrees from the floor line of the vehicle, consequently, at certain times of the day the sunlight shines directly through this window into the interior of the vehicle. A curtain would, of course, exclude the sun's rays, but this would not be practical, as the driver would have no rear vision whatsoever, and I have therefore provided a blind unit which will exclude the direct sun rays without obstructing rear vision.

The blind is formed as clearly shown in the accompanying drawing, and comprises a pair of spaced apart bar supports 10 to which a plurality of relatively thin clips 11 are welded or otherwise secured, these clips projecting at an angle to the supports and a plurality of thin slats 12 are secured thereto; these slats can be of wood or metal, and can be welded or riveted to the clips, and if the wood is used the slats can be bolted or otherwise secured.

The lower ends of the bar supports 10 project below the bottom slat and are bent inwardly as at 13, the extreme end being wedge shaped as at 14 so that it snugly fits between the window frame 15 and the felt or rubber strip 16 in which the glass 17 is set. The upper end of each bar support 10 is turned at right angles to the main body as at 18 and a suitable opening is provided therein, a lug 19 being welded to the bar at a point intermediate its length, said lug projecting outwardly and in vertical alignment with the turned end 18, and is also provided with an opening in vertical alignment with the opening in the turned end of the support.

Pins 20 are mounted in the openings provided in the members 18 and 19, and a preferably square washer 21 is welded on each pin at a point intermediate its length, a coil spring 22 being mounted on the pin and being interposed between the washer and the lug 19, so that the spring 22 exerts an upward pressure on the pins 20 at all times.

The upper end of the pins 20 are bent at an angle similar to the lower end of the bar 10, these ends being wedge shaped as at 23, so that they readily seat themselves when the blind is mounted.

The back face of the bar supports 10, together with the spring and lugs etc. mounted thereon is concealed from view by means of a channel shaped strip 24, which fits over and frictionally engages the side walls of the bar supports, thus insuring a clean and neat appearance.

To mount the blind the wedge shaped ends 23 of the pins 20 are forced upwardly between the window frame and the rubber strip 16, thus compressing the springs 22, the lower ends 13 are then swung against the glass so that the wedge shaped ends 14 also enter the groove between the frame and strip 16, then by releasing the blind, the springs 22 will force the pins 20 upwardly and the blind will be securely held in position.

It will, of course, be understood that the support bars 10 can be punched and the punched strips bent to form slat supports to eliminate the clips 11, however, I find that the clips work out to very good advantage.

In some vehicles the rear end is slightly V-shaped and the window may be oval or any other shape, and when this occurs the slats are suitably spaced to accommodate the V-shape, and the lengths of the slats varied to suit the contour of the window.

From the foregoing description it will be obvious that I have perfected a very simple, practical, and effective blind structure for excluding direct sunlight through the rear windows of streamlined automotive vehicles.

What I claim is:

1. The combination in a vehicle having a rear window provided with trim and a flexible strip, of a quickly detachable blind structure mounted therein and provided with spring actuated, extensible supports, with the ends of the supports inserted between the window trim and the flexible strip in which the glass is set, for excluding direct rays of sunlight without obstructing the driver's view through the rear window.

2. A blind unit adapted to be detachably mounted on a vehicle rear window and comprising spaced apart supports formed with offset wedge shaped lower ends, slats mounted on said supports in spaced relation, pins slidably mounted on the upper end sections of said supports, resilient means associated with said pins and forcing them outwardly beyond the ends of the supports, and channel shaped strips frictionally engaging said supports and forming a closure for the springs and back of said supports.

3. A blind unit adapted to be detachably secured to the rear window of an automobile and comprising spaced apart supports having inwardly bent lower end sections terminating in wedge shaped tips adapted to be inserted between the window frame and the trim, laterally disposed clips on the supports, spring pressed pins mounted on the upper ends of the supports and formed with wedge shaped upper end sections adapted to be inserted between the upper edge of the window frame and the trim, channel shaped members forming a back cover for the supports, and slats mounted on said clips.

4. A blind unit adapted to be secured to the rear window of an automobile, and comprising automatically extendable bar supports having offset end sections terminating in wedge shaped tips adapted to detachably engage the window frame, a quickly detachable channel shaped member frictionally engaging and forming a closure for the back of the bar supports, and spaced apart slats mounted on said supports.

ROBERT C. KRAMER.